United States Patent [19]
Teeters

[11] 3,940,738
[45] Feb. 24, 1976

[54] ELECTRIC LOCK

[76] Inventor: Lloyd L. Teeters, 17834 N. 18th Drive, Phoenix, Ariz. 85023

[22] Filed: July 10, 1974

[21] Appl. No.: 487,382

[52] U.S. Cl. .......................... 340/147 MD; 317/134
[51] Int. Cl.² G08B 21/00; H04Q 9/00; E05B 49/00
[58] Field of Search ...... 340/147 MD, 149 R, 164 R

[56] References Cited

UNITED STATES PATENTS

| | | | |
|---|---|---|---|
| 3,622,991 | 11/1971 | Lehrer | 340/147 R |
| 3,659,154 | 4/1972 | Finn | 340/147 R |
| 3,688,269 | 8/1972 | Miller | 340/149 R |
| 3,735,374 | 5/1973 | Rembault | 340/149 A |
| 3,781,804 | 12/1973 | Lederer, Jr. | 340/147 MD |
| 3,790,957 | 2/1974 | Dukes, et al. | 340/149 R |
| 3,838,395 | 9/1974 | Suttill, Jr. et al. | 340/149 R |
| 3,851,314 | 11/1974 | Hedin | 340/147 MD |

*Primary Examiner*—Donald J. Yusko
*Attorney, Agent, or Firm*—Warren F. B. Lindsley

[57] ABSTRACT

An electric lock and associated electronic control circuits, the circuit being activated by the insertion of a slotted key into a keyway where the presence and absence of slots at a number of positions is sensed by a set of photoelectric devices which deliver signals through appropriate microcircuit logic to energize electric solenoids actuating the bolt of the locking mechanism. Additional features are incorporated including a time-delay circuit for locking the door and an alarm latch to discourage tampering with the lock.

5 Claims, 9 Drawing Figures

$\bar{E}=0$
| C | B | A | $\overline{Q7}$ | $\overline{Q6}$ | $\overline{Q5}$ | $\overline{Q4}$ | $\overline{Q3}$ | $\overline{Q2}$ | $\overline{Q1}$ | $\overline{Q0}$ |
|---|---|---|---|---|---|---|---|---|---|---|
| 0 | 0 | 0 | 1 | 1 | 1 | 1 | 1 | 1 | 1 | 0 |
| 0 | 0 | 1 | 1 | 1 | 1 | 1 | 1 | 1 | 0 | 1 |
| 0 | 1 | 0 | 1 | 1 | 1 | 1 | 1 | 0 | 1 | 1 |
| 0 | 1 | 1 | 1 | 1 | 1 | 1 | 0 | 1 | 1 | 1 |
| 1 | 0 | 0 | 1 | 1 | 1 | 0 | 1 | 1 | 1 | 1 |
| 1 | 0 | 1 | 1 | 1 | 0 | 1 | 1 | 1 | 1 | 1 |
| 1 | 1 | 0 | 1 | 0 | 1 | 1 | 1 | 1 | 1 | 1 |
| 1 | 1 | 1 | 0 | 1 | 1 | 1 | 1 | 1 | 1 | 1 |
FIG-2
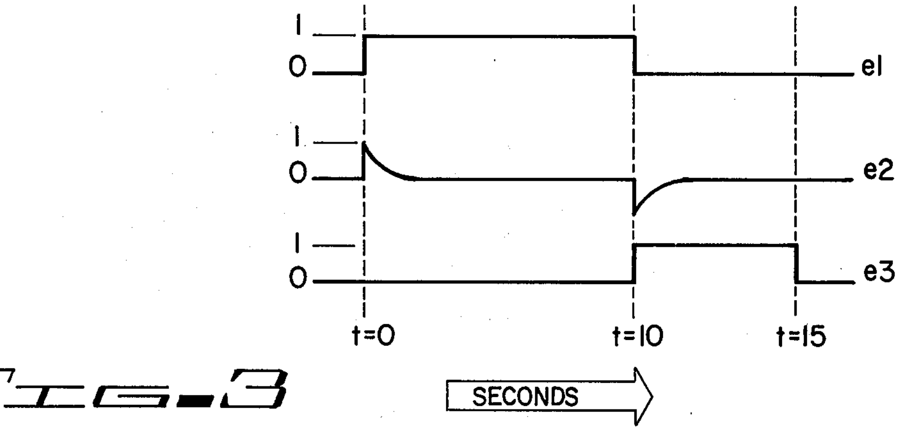
FIG-3
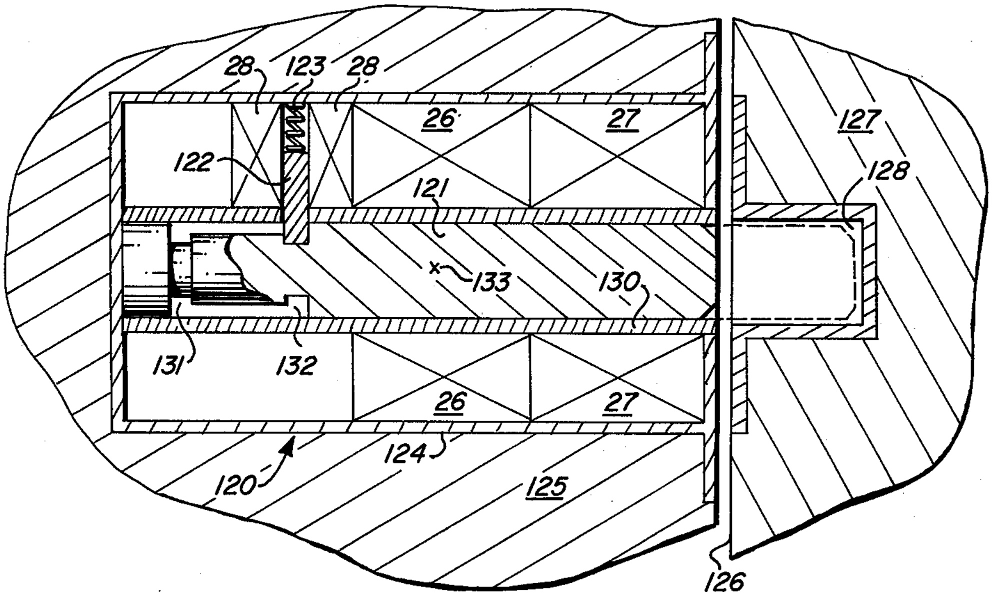
FIG-4

ELECTRIC LOCK

BACKGROUND OF THE INVENTION

In the interest of stemming the growing rate of burglaries and unlawful entries into homes and other buildings, much attention has been given recently to the provision of better locks for doors.

It is widely recognized that the simpler mechanical locks often constitute only a minor obstacle to a professional burglar or even to a clever novice. In some cases a door may be unlocked by simply forcing the latch open with a plastic playing card, while even the most intricate and expensive mechanical lock is no match for a skilled professional burglar.

The availability of low cost electronic devices such as photo-electric sensors and microcircuit logic of the type employed in digital computers opens up new opportunities for the development of fool-proof electric locks. Because of the high volume utilization of components of this type, and because of the high degree of complexity and flexibility incorporated in the microcircuit logic packages, it is possible to produce a very sophisticated but relatively inexpensive electric lock using these components.

The opportunity for utilizing such components in the design of an electric lock is just beginning to be recognized and numerous innovations in this field will surely arise in the immediate future.

SUMMARY OF THE INVENTION

In accordance with the invention claimed an electric lock and associated electronic control circuits are provided, the control circuits rendering such an electric lock superior to present mechanical locks in terms of their effectiveness against tampering and unlawful entry.

It is therefore, one object of this invention to provide an electronically controlled lock.

Another object of this invention is to provide such electronic control circuits wherein the actuation of the circuits and the operation of the lock are accomplished by means of a slotted key.

A further object of this invention is to incorporate into the design of the associated control circuits a facility for providing large numbers of uniquely coded sensing patterns so that each specially coded installation will require its own slotted key for operation.

A still further object of this invention is to incorporate into the design of the lock and control circuits a safety feature wherein an attempt to tamper with the lock or to use an improperly slotted key or other device will sound an alarm and thereby discourage any further attempts of this sort.

A still further object of this invention is to provide with such control circuits a number of switches which are operable from inside the door and which may be used to lock or unlock the door without the use of the slotted key.

A still further object of this invention is to provide as an additional feature of such control circuits a time delay circuit which allows the operator to press a button before leaving and closing the door with the result that the door will lock automatically at the termination of the delay period.

A still further object of this invention is to provide such control circuits wherein the coding of the sensing circuits may readily be altered to require the use of a new or modified slotted key.

A still further object of this invention is to provide such control circuits through the utilization of standard integrated circuit devices which are readily available at low cost.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 2 is a TRUTH TABLE indicating the decoding matrix for an integrated circuit which is employed to decode the logic signals obtained from a set of optical sensors.

FIG. 3 illustrates the operating waveforms for a pair of time-delay circuits employed in an automatic locking feature provided as a part of the invention.

FIG. 4 is a cross-sectional representation of the mechanical portion of the lock and of the solenoids employed in its actuation.

DESCRIPTION OF THE PREFERRED EMBODIMENT

Figure 1A:
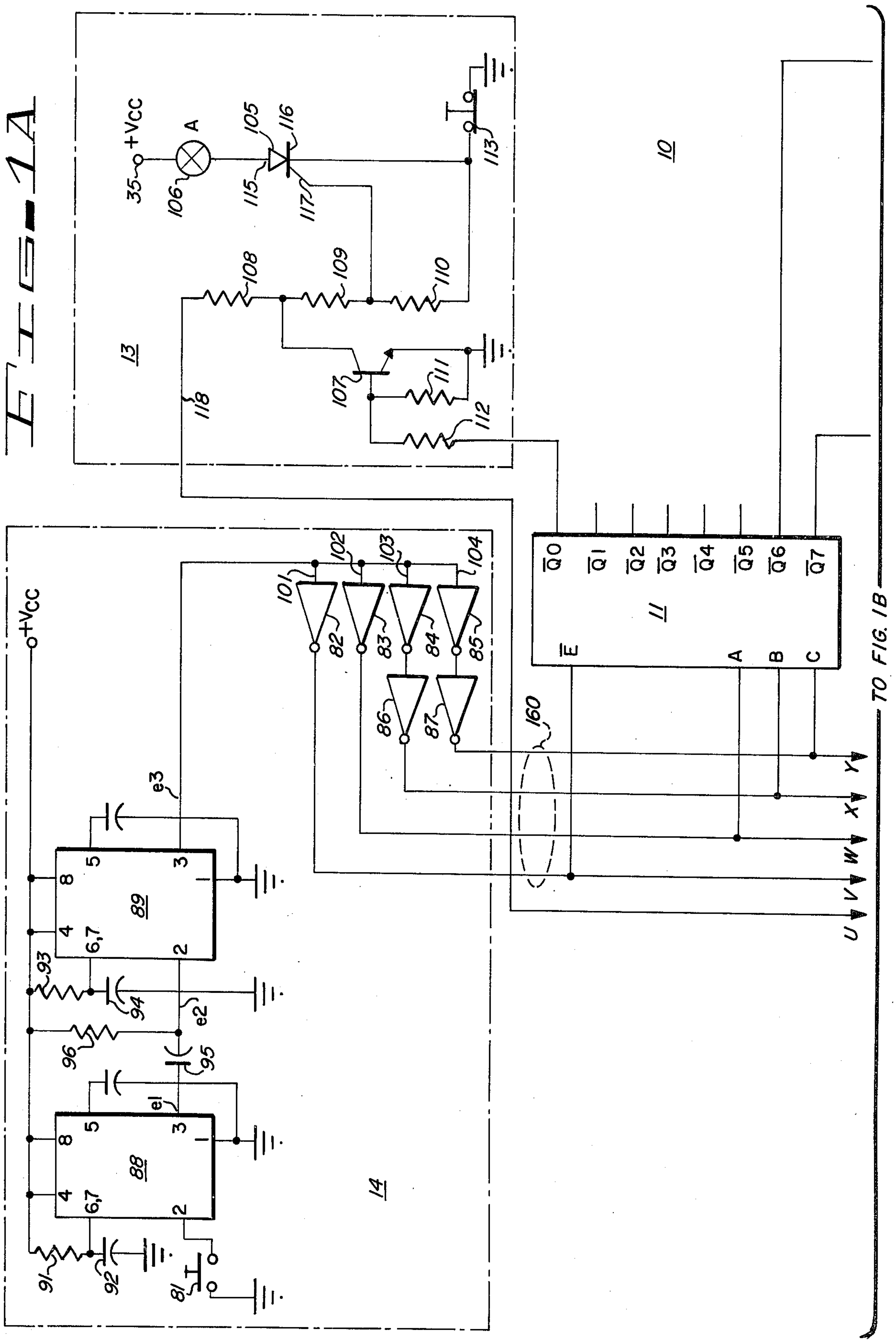
FIGS. 1A and 1B are schematic illustrations of electronic circuits for controlling the operation of a lock.
Figure 1B:
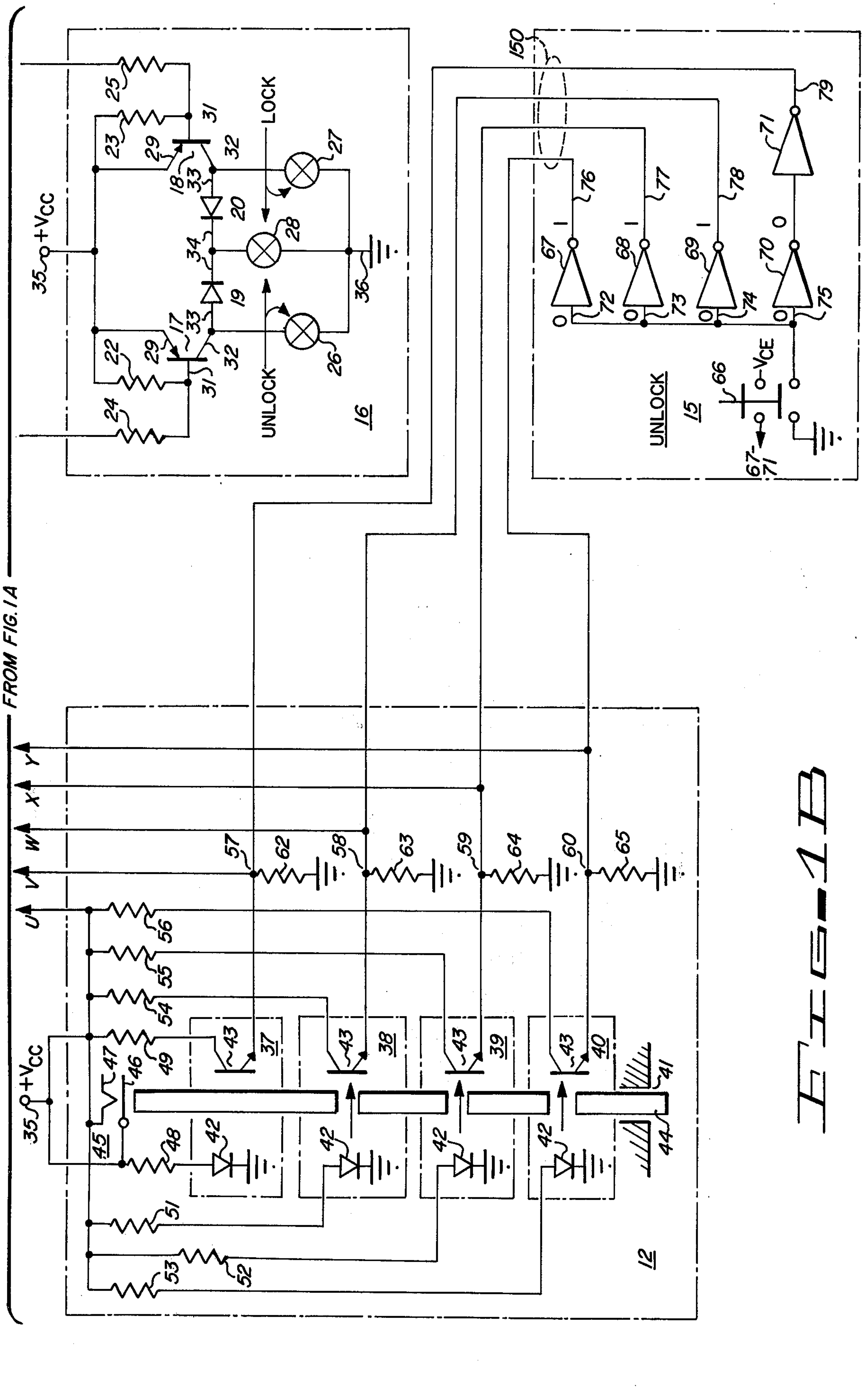

Referring more particularly to the drawing by characters of reference, FIGS. 1A and 1B illustrate the electronic control circuit 10 which, along with a specially designed electro-mechanical bolt, comprise the instant invention.

The control circuit 10 as illustrated in FIGS. 1A and 1B comprise a number of separate control blocks including a central logic decoder 11, an optical sensor matrix 12, an alarm latch 13, a time-delay circuit 14, an unlock command circuit 15, and a solenoid actuator 16. The decoder 11 interprets signals received from sensor matrix 12, from time-delay circuit 14 and from unlock command circuit 15 and responds by appropriately setting the actuator 16 to lock or unlock the door or by setting alarm latch 13.

The decoder 11 is an integrated circuit commonly employed in digital computers of a type known as a "binary to one-of-eight line decoder." The circuit has three binary signal input terminals. Each of these input terminals receives binary data, i.e., "ones" or "zeros" as represented by a small positive voltage or by a condition of zero volts, respectively. Since each of the three input terminals may be either at one or at zero, there are eight different combinations possible. The decoder is designed to respond to each of these eight combinations by setting a corresponding one of its eight output terminals.

FIG. 2 illustrates the relationships between input signals and output signals for the decoder 11 and is commonly called a "truth table." The input terminals are identified as A, B and C, and the output terminals are identified as $\overline{Q}0$ through $\overline{Q}7$. In the truth table of FIG. 2, the top row identifies input and output terminals for the eleven columns, e.g., the signals in the left-hand column are represented as being present at input terminal C, etc. Each of the rows of ones and zeros represents a given set of conditions at the three input terminals A, B and C and indicates the resulting signal levels at the output terminals, $\overline{Q}0$ through $\overline{Q}7$. Thus, for example, if ones are set at all three input terminals as shown in the bottom row, output $\overline{Q}7$ will be zero and the other seven outputs will be ones. Note that for each combination of ones and zeros at the input terminals as represented by each of the eight rows in the table, only one of the output signals will be zero and the other seven will be ones.

An additional feature of the decoder 11 is an "enable" input terminal which is commonly referenced as the $\overline{E}$ terminal. The decoder is "enabled" only when the $\overline{E}$ terminal is in a zero or grounded state. If the decoder is not enabled in this manner, all of the output terminals will be in the one state regardless of the signals present at the input terminals.

For additional details and descriptive information related to the decoder 11, see Motorola Semiconductor Products' "TTL Integrated Circuits Data Book," First Edition (May 1971). Section 11 describes in detail the decoder employed in this invention, the decoder being identified by Motorola as the MC4006.

Referring again to FIG. 1, decoder 11 responds to signals at its input terminals, A, B, and C (provided $\overline{E}$ is at a zero condition) to set alarm latch 13 or to operate solenoid actuator 16. To set the alarm latch 13, output $\overline{Q}0$ must be zero, and to operate actuator 16, either output $\overline{Q}6$ or output $\overline{Q}7$ must be zero. From the foregoing discussion it is recognized that only one of these output terminals can be in a zero condition at a given time.

It is appropriate at this time to discuss the operation of the solenoid actuator 16. Actuator 16 comprises two p-n-p transistors 17 and 18, two semiconductor diodes, 19 and 20, two base-emitter resistors, 22 and 23, two base drive resistors 24 and 25, and three solenoids, 26, 27 and 28.

The transistors 17 and 18 are typical three-layer semiconductor devices, each having an emitter 29, a base 31, and a collector 32. Current is passed readily from emitter to collector if sufficient emitter-to-base current is flowing. If there is no emitter-to-base current, the transistor presents a high impedance to emitter-collector current.

Diodes 19 and 20 are two-layer semiconductor devices each having an anode 33 and a cathode 34. Current flows easily from anode to cathode but is substantially blocked in the opposite direction.

Both devices, the transistor and the diode are discussed in detail in numerous semiconductor texts and handbooks.

The solenoids 26, 27 and 28 are mounted inside the electromagnetic locking mechanism and will be described in greater detail at a later point in the specification. At this point it is sufficient to state that the three solenoids must be energized in pairs to accomplish a given function, e.g. solenoids 26 and 28 must be energized simultaneously to UNLOCK the mechanism and solenoids 27 and 28 must be energized simultaneously to LOCK the mechanism.

Thus, to accomplish the UNLOCK function, transistor 17 is turned ON by supplying a zero or ground signal at decoder 11 output terminal $\overline{Q}7$, thereby causing an emitter-base current to flow from +V*cc* source terminal 35 through emitter 29 to base 31 of transistor 17 and through resistor 24 to terminal $\overline{Q}7$ of decoder 11. In the presence of this emitter-base current, transistor 17 is effectively "saturated," i.e. it presents a low impedance to emitter-collector current so that a second and much larger current flows at the same time from terminal 35 through emitter 29 and collector 32 of transistor 17. At collector 32 of transistor 17 the emitter-collector current splits into two parallel paths, the first path being through solenoid 26, and the second path through diode 19 and solenoid 28, both paths terminating at ground return 36. While $\overline{Q}7$ is at a zero state, $\overline{Q}6$ is at a one state, i.e. a positive voltage is present at $\overline{Q}6$, and this positive voltage holds transistor 18 in an "off" condition by preventing base-emitter current. Base-emitter resistor 23 also aids in holding transistor 18 off by supplying an external path for base-collector leakage current.

The LOCK function is accomplished in a similar manner. In this case $\overline{Q}6$ is zero or at ground potential while $\overline{Q}7$ is at a one state or positive. Transistor 17 is thus in an off condition and transistor 18 is in an "on" condition. Emitter-collector current from transistor 18 now energizes solenoid 27 and it also energizes solenoid 28 via diode 20 as required to effect the LOCK function.

The means by which the appropriate input signals are supplied to decoder 11 for the unlocking and locking functions will now be explained, first as delivered by the optical sensor matrix 12, then by the unlock command circuit 15, and finally by the time-delay circuit 14.

The optical sensor matrix 12 utilizes four optical sensors, 37, 38, 39 and 40. These devices as employed in this invention are made by Texas Instruments and marketed as Type TIL138. Each device consists of a gallium arsenide light-emitting diode and an n-p-n silicon phototransistor mounted in a molded plastic housing. The diode and the photo-transistor are mounted in separate projections of the plastic housing, an open slot separating the projections. Light emitted by the diode spans the slot and strikes the photosensitive area of the transistor turning the transistor on unless the light is blocked by an intervening object inserted in the slot.

In FIG. 1A, the light-emitting diode and the phototransistor are identified as 42 and 43, respectively, in each of the devices 37–40. The slotted key 44 is shown inserted in the keyway 41 with slots in key 44 passing light between diode 42 and phototransistor 43 for devices 38, 39 and 40, but blocking light between diode 42 and phototransistor 43 for device 37. The upper end of key 44 bears against an interlock type switch 45, the switch having a lower contact 46 and an upper contact 47. Before key 44 comes to bear against lower contact 46, the switch 45 is open. Under this condition, current is supplied to light-emitting diode 42 from +V*cc* supply terminal 35 flowing through limiting resistor 48 and diode 42 to ground. Phototransistor 43 of device 37 is also connected to +V*cc* source terminal 35 through collector resistor 49. The diode limiting resistors 51, 52 and 53 connected to diodes 42 of devices 38, 39 and 40, respectively, and the collector resistors 54, 55 and 56 for devices 38, 39 and 40, respectively, are all connected to upper terminal 47 of switch 45 which is not connected to +V*cc* terminal 35 unless switch 45 is closed.

For these conditions it is thus evident that none of the phototransistors 43 of any of the devices 37–40 is passing current, device 37 being prevented therefrom because the key 44 blocks light between diode 42 and transistor 43, and the other devices 38–40 because neither the diode 42 nor the transistor 43 is energized. Output terminals 57, 58, 59 and 60, respectively, of devices 37, 38, 39 and 40 are thus at ground potential by virtue of their connection through emitter resistors 62, 63, 64 and 65. Input terminals A, B and C and enable terminal $\bar{E}$ of decoder 11 are therefore all in a zero state and, as indicated by the truth table of FIG. 2, all output terminals of decoder 11 with the exception of $\bar{Q}0$ are in a one state. As will be explained later, a zero at $\bar{Q}0$ is a condition required to set alarm 13, but in this case this action is prevented by virtue of the fact that switch 45 has not closed to supply positive potential $+Vcc$ to alarm circuit 13. Both $\bar{Q}6$ and $\bar{Q}7$ are high and consequently neither a LOCK nor an UNLOCK operation is effected.

When key 44 is now fully inserted in the keyway 41, the upper end of key 44 bears against lower contact 46, thereby driving it against upper contact 47, closing switch 45 and thus supplying current to diodes 42 and phototransistors 43 of devices 38-40 are now rendered conductive by light passing through slots in key 44, and sensor matrix output terminals 58, 59 and 60 are therefore positive by virtue of currents from these transistors flowing through emitter resistors 58, 59 and 60 to ground. Output terminal 57 is still at zero because light cannot pass between diode 42 and phototransistor 43 of device 37. Enable terminal E is thus at a zero state and inputs A, B and C are all in the one state. For this condition, the truth table of FIG. 2 indicates that output terminal $\bar{Q}7$ is at the zero state. As indicated earlier, this is the condition for effecting an UNLOCK operation through the operation of actuator 16. Once the UNLOCK operation has been completed, the key 44 may be removed without initiating any undesired additional operations.

The unlock command circuit 15 of FIG. 1 provides a means for effecting an UNLOCK condition from inside the house or other building by the operation of a momentary push-button switch 66. In addition to switch 66, command circuit 15 includes a number of inverter-amplifiers 67, 68, 69, 70 and 71. These inverter-amplifiers are widely employed in digital computers as gates, amplifiers and inverters. Usually they have more than one input terminal and can be used as gates. In this case, however, only one input terminal is employed and the only function is inversion and amplification in terms of the driving current. The amplification also amounts to a degree of isolation between input and output terminals. The inverting function comprises the conversion of a zero input to a one at the output or vice versa. Motorola's MC7400 device incorporates four of these devices in one semiconductor package. Additional details defining this device are contained in Motorola Semiconductor Products "TTL Integrated Circuits Data Book," Section 12, First Edition, May 1971.

To effect an UNLOCK operation, switch 66 is closed, thereby grounding input terminals 72, 73, 74 and 75 of amplifiers 67–70. The resulting one signals at the outputs of inverter-amplifiers 67, 68 and 69 are seen to be connected by lines 76, 77 and 78 to decoder terminals C, B and A, respectively. The resulting one output of amplifier 71 and the zero output of amplifier 71 is delivered by line 79 as an "enable" signal to terminal $\bar{E}$ of decoder 11. The conditions A=B=C=1 and $\bar{E}$=0 have thus been set for decoder 11 for which the truth table of FIG. 2 indicates $\bar{Q}7$=0. Again, as desired, this is the condition required to effect an UNLOCK operation through actuator 16.

In utilizing the electric lock of this invention it is desirable that a push-button be provided to allow locking the door before leaving the house or other building in which it is installed. The push-button should preferably be located inside the structure to prevent the door from being locked from outside against the wishes of the occupant. Obviously, the person leaving the structure must initiate the locking operation before stepping outside, but the locking action must not be completed until he has had time to get outside and close the door.

The time-delay circuit 14 which meets these requirements comprises a momentary push-button switch 81, six inverter-amplifiers, 82–87, and two timer circuits 88 and 89.

Timer circuits 88 and 89 are integrated circuits supplied by a number of manufacturers under the identification number 555. Signetics Corporation in its 1972 Integrated Circuits handbook for digital linear and MOS integrated circuits discusses on page 6–5.2 operation of the 555 as a monostable "one-shot" which is the mode of operation employed in this invention. The one-shot is another circuit commonly employed in digital computers for the generation of a pulse of a desired length. The length of the pulse is ordinarily set by means of an RC network (Resistor - Capacitor network).

In the case of timer 88 of FIG. 1, resistor 91 and capacitor 92 determine the delay period, delay time in seconds being equal, approximately to the product of resistance and capacitance for these two components. With switch 81 in the open condition, output terminal 3 of timer 88 is at a zero level. If input terminal 2 is grounded momentarily closing switch 81, the output at terminal 3 immediately switches to a one state (positive voltage level) and remains in the one state until the termination of the delay period as determined by the resistance-capacitance product for resistor 91 and capacitor 92. At the end of the timing period output terminal 3 returns to the zero state.

The second timer 89 is also connected as a one-shot utilizing a timing resistor 93 and a timing capacitor 94. The output of timer 88 is connected to the input of timer 89 through a coupling capacitor 95. A "pull-up" resistor 96 holds input terminal 2 of timer 89 at $+Vcc$ under steady-state conditions.

The operating waveforms of timers 88 and 89 are shown in FIG. 3 where $e1$ is the output signal of timer 88, $e2$ is the input signal of timer 89 and $e3$ is the output signal of timer 89.

The operation of timer 88 is initiated by momentarily closing LOCK switch 81 which momentarily grounds input terminal 2. Signal $e1$ immediately rises to a one level as shown in FIG. 3 and remains at the one level for 10 seconds as determined by resistor 91 and capacitor 92. As $e1$ rises to the one level at $t$=0, a positive pulse is coupled to input terminal 2 of timer 89 as illustrated by waveform $e2$ of FIG. 3. The positive pulse at input terminal 2 has no effect on timer 89 as only a ground or zero signal is capable of initiating the timer operation. At $t$=0 seconds, however, when $e1$ falls to zero a negative pulse is coupled to input terminal 2, as shown by waveform $e2$ of FIG. 3, the negative pulse constituting a momentary zero or ground signal which initiates the operation of timer 89. Timer 89 reacts to supply at its output terminal 3, a positive pulse initiated at $t$=10 and terminating at $t$=15 as illustrated by waveform $e3$ of FIG. 3. (Resistor 93 and capacitor 94 are in this case set for a delay period of 5 seconds).

It will be recognized from an examination of the waveforms of FIG. 3 that from the instant, $t$=0, that LOCK switch 81 is closed, no effect of this closing is seen at output terminal 3 of timer 89 for a period of 10 seconds. During the ten seconds, the person who has momentarily closed switch 81 has time to step outside and close the door. At the end of 10 seconds output terminal 3 of timer 89 switches to a one state where it remains for 5 seconds. During the 5 seconds, input terminals 101–104 of inverter-amplifiers 82–85, respectively, are at a one state by virtue of their common connection to output terminal 3 of timer 89. The resulting zero levels at the output terminals of inverter-amplifiers 82 and 83 are connected to enable terminal $\overline{E}$ and to input terminal A, respectively, of decoder 11. The zero output signals of inverter-amplifiers 84 and 85 are inverted again to ones by inverter-amplifiers 86 and 87, respectively, and are delivered as ones to decoder input terminals B and C. The conditions, E=A=0 and B=C=1 are thus set as inputs for decoder 11, and as indicated by the truth table of FIG. 2, $\overline{Q}6$ is consequently set to a zero state, thereby effecting the LOCK operation through actuator 16 as desired.

Alarm latch 13 comprises a silicon-controlled rectifier 105, an audio alarm 106, an n-p-n transistor 107, resistors 108, 109, 110, 111, and 112 and momentary reset switch 113.

The silicon controlled rectifier 105 is a four-layer semiconductor device having an anode 115, a cathode 116 and a gate 117. Controlled rectifier 105 always blocks current flow from cathode 116 to anode 115 and it also blocks current flow from anode 115 to cathode 116 unless it has been triggered on by a positive pulse of current into gate 117. Once anode-to-cathode current has been initiated the controlled rectifier continues to conduct current from anode to cathode until the current is interrupted by some external means as, for example, by the momentary opening of reset switch 113. Once anode-to-cathode current has been interrupted, the controlled-rectifier returns to its blocking state relative to anode-to-cathode current and it remains in the blocking state until triggered on again by a positive current into the gate. Additional information describing silicon controlled rectifiers may be found in handbooks published by various manufacturers as, for example, in the General Electric Company's "Controlled Rectifier Manual," Copyright 1960 as a first edition and in a number of successive editions.

In FIGS. 1A and 1B two conditions are necessary in order to supply a positive gate current to controlled rectifier 105 of alarm latch 13. First, a positive voltage must be supplied to input line 118. This condition requires that switch 45 must be closed by key 44 or by some other object inserted in the keyway 41. The second condition required is that transitor 107 must be turned off. If transistor 107 is turned off, a positive current flowing into line 118 from switch 45 and +V$cc$ terminal 35 flows downward through resistors 108 and 109 into gate 117. If transistor 107 is turned on, however, by a positive or one signal from output $\overline{Q}0$ of decoder 11, transistor 107 by-passes the current from line 118 and resistor 108 to ground, thereby preventing its flow into gate 117. A diode may also be substituted for resistor 109, its cathode connected to gate 117 of controlled rectifier 105 and its anode connected to the lower end of resistor 108. The diode may be somewhat more effective as a threshold device blocking gate current when transistor 107 is turned on.

If it is now assumed that a knife or other object is inserted into the keyway 41 in place of key 44 and that the object blocks light between diodes 42 and phototransistors 43 of devices 37-40 while closing switch 45, ground or zero signals will be applied to terminals E, A, B and C of decoder 11. The result as seen from the truth table of FIG. 2 is that decoder output terminal $\overline{Q}0$ goes to a zero or grounded state. The zero state at $\overline{Q}0$ turns transistor 107 off and permits a positive gate current to flow originating at positive source 35, flowing through switch 45, line 118, resistors 108 and 109 and into gate 117 of controlled-rectifier 105. Controlled-rectifier 105 thus turns on causing audio alarm 106 to be energized by a current flowing from terminal 35 through audio alarm 106, anode 115 to cathode 116, and switch 113 to ground. The person tampering with the lock will hopefully be discouraged from any further attempts at picking the lock. To stop the alarm, the foreign object is removed from the key-way and anode-cathode current is interrupted by momentarily opening reset switch 113.

A special solenoid-operated bolt mechanism 120 as illustrated in FIG. 4 is utilized in the practice of this invention. Mechanism 120 comprises a main bolt 121, a latching bolt 122 and return spring 123 and solenoid coils 26, 27 and 28, the solenoid coils 26, 27 and 28 being shown also in FIG. 1 as connected in actuator 16. The mechanism 120 is contained in a housing 124 which is mounted in the door jamb 125.

The main bolt 121 is made from a magnetic material generally cylindrical in form, oriented horizontally within mechanism 120, and perpendicularly to the opening edge 125 of adjacent door 127. A bolt-hole 128 is provided in door 127 at edge 126 which is also horizontally oriented and aligned with bolt 121. Bolt 121 is shown in the unlocked position by its solid line cross-hatched representation in FIG. 4; its locked position is represented by the broken-line representation extending into bolt-hole 128, the free motion between these two positions being facilitated by a low-friction sleeve 130 surrounding bolt 121. The left-hand end of bolt 121 is specially machined to be restrained by latching bolt 122. The machining comprises two annular grooves, 131 and 132 spaced apart a distance equal approximately to the depth of bolt-hole 128 which is the desired length of travel for bolt 121. The portion of bolt 121 lying between grooves 131 and 132 is turned down to a diameter less than that of the main portion of bolt 121 but greater than the diameter of the circle described by the base of groove 131 or 132. When bolt 121 is in the unlocked position as shown in FIG. 4, latching bolt 122 rests inside forward groove 132 where it is held by return spring 123. When bolt 121 is in the locked position, groove 131 will lie directly under the position of latching bolt 122, and bolt 122 will rest inside groove 131. In either case, latching bolt 122 resting in groove 131 or 132 restrains bolt 121 from moving in either direction.

Latching bolt 122 is preferably rectangular in cross-section rather than cylindrical so that it will fit more securely within grooves 131 and 132. It is also fabricated from a magnetic material.

When solenoid coil 28 is energized the current flowing therein encircles bolt 122 and produces the typical solenoid effect of causing bolt 122 to move toward the center of coil 28. In this case this implies an upward motion of bolt 122 against the force of return spring 123.

While bolt 122 is thus held in its upward position it is disengaged from grooves 131 and 132, but it is not sufficiently withdrawn to clear the main body of bolt 121. The motion of bolt 121 is thus limited to the distance between grooves 131 and 132. Further, while bolt 122 is in its upward position, bolt 121 can be moved to the left or to the right by energizing, respectively, coil 26 or coil 27. If coil 26 is energized, for example, the center point 133 of bolt 121 will be moved to a position under the center of coil 26. If coil 27 is energized, center point 133 will be moved to the right to a point under the center of coil 27. It is thus seen that coil 26 moves bolt 121 to the unlocked position while coil 27 moves bolt 121 to the locked position, but in either case no motion of bolt 121 is possible unless coil 28 is simultaneously energized to withdraw bolt 122 from groove 131 or 132.

A very practical and effective electric lock has thus been provided in a design which utilized electronic devices and integrated circuits which are readily available at low cost because of their high-volume usage in digital computers. The means available for altering the coding of the lock include the options of variable location of the optical sensor devices along the length of the keyway and the selection of alternate decoder output pins for the operation of the actuator. The latter option of course requires appropriate changes in logic connections for the push-button actuated lock and unlock circuits.

Figure 5:
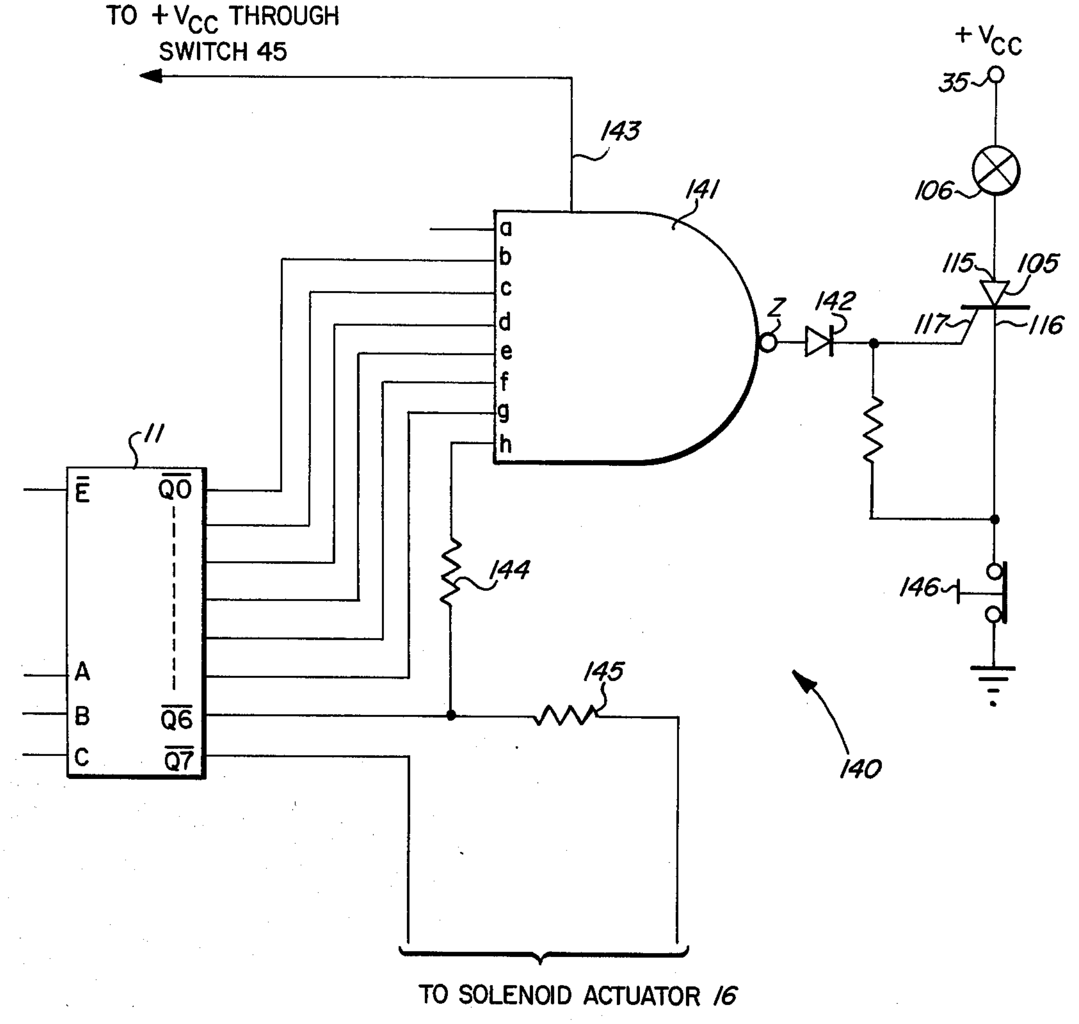
FIG. 5 is an illustration of an alternate alarm circuit.

An alternate alarm circuit 140 is shown in FIG. 5. Circuit 140 utilizes controlled rectifier 105, alarm 106, and reset swtich 113 of alarm circuit 13 but in the embodiment of FIG. 5 another means for triggering controlled rectifier 105 is employed. In this case, eight input NAND gate 142 is utilized along with semiconductor diode 122.

NAND gate 141 is a commonly used integrated circuit having eight inputs, *a*, *b*, *c*, *d*, *e*, *f*, *g* and *h* and an output terminal *z*. The output terminal is at a one state (positive voltage) if at least one of the input terminals is zero (ground), and the output terminal is at a zero state if all of the input terminals are at a one state. The output terminal will, of course, also be at zero (ground) if no source voltage is applied at supply terminal 143. Motorola Semiconductor Products, Inc., integrated circuit MC7430 is a device of this type and additional information and characteristics are given in Motorola's TTL Integrated Circuits Data Book, First Edition, May 1971.

In the alarm circuit 140 of FIG. 5 inputs b through h, respectively, of NAND gate 141 are connected directly to outputs $\overline{Q}0$ through $\overline{Q}6$, respectively, of decoder 11. Decoder 11 is the same decoder 11 that is shown in FIG. 1B, and is in this case also connected to solenoid actuator 16 as in FIG. 1B. In FIG. 5 the resistors 144 and 145 have been incorporated to guarantee division of drive current from decoder 11 output $\overline{Q}f$ to NAND gate 141 input *h* and to solenoid actuator 16. Diode 142 is to guarantee that when output terminal z is at a zero state, the low value of voltage present will be insufficient to trigger controlled rectifier 105.

The operation of alarm circuit 140 occurs as follows: Unless the key 136 or some other object is inserted in keyway 41 to close switch 45, no voltage is present at supply terminal 143 of gate 141 and output terminal *z* is at a nominal voltage of zero in which case no trigger voltage is supplied to turn on rectifier 105 under any conditions at input terminals *a* through *h* of gate 141.

If the proper key 146 is inserted in keyway 41 only output terminal $\overline{Q}7$ of decoder 11 will be at zero (ground) this being the proper condition to UNLOCK, and the remaining outputs $\overline{Q}0$ through $\overline{Q}6$ of decoder 11 as well as all inputs *a* through *h* of gate 141 will accordingly be low. Again controlled rectifier 105 will not be turned on.

If, however, an improper key or another object is inserted in keyway 41 and any but the proper combination of input signals, E, A, B and C are triggered, one of the decoder output terminals $\overline{Q}0$–$\overline{Q}6$ will go to a zero state as will one of the input termminals, *b–h* of gate 141. Output terminal *z* of gate 141 will accordingly go to a one state (positive voltage level) and a positive gate drive current will be delivered to gate 117 of controlled rectifier 105 which will in turn be triggered to a latched conducting state, thereby energizing alarm 106 and causing it to sound an audible alarm until reset button 146 is pressed to reset rectifier 105 to a non-conducting state.

Although it was not discussed in the earlier description of the special LOCK circuit 14 and of the UNLOCK circuit 15, an interference problem exists between these circuits and the key operated UNLOCK circuit 12. This problem was intentionally not brought out in connection with the earlier discussion of the circuits of FIGS. 1A and 1B in order not to confuse or complicate the explanation of the circuit operation.

The problem arises because of the nature of the inverter-amplfiers 67–71 and 82–87. In the earlier discussions it was shown that these devices could be controlled to deliver the required zero or one outputs to effect the LOCK or UNLOCK functions. It was not pointed out, however, that when these circuits are not being utilized for the intended purposes the outputs of these devices can upset the operation of the key operated UNLOCK circuit 12.

Consider, for example UNLOCK circuit 15 in the rest state wherein push-button switch 66 is in the open condition. With switch 66 open the inputs to amplifiers 67–70 are all ones and the four output signals of circuit 15 are just the opposite of those required to effect the UNLOCK operation, i.e. lines 76–78 are at the zero or ground state and line 79 is high or at the one state. These signals are therefore in competition with the UNLOCK signals delivered by the key-operated circuit 12 and thus will interfere with the operation of circuit 12 as well as with the operation of circuit 14.

Similarly, the output signals delivered by amplifiers 82, 83, 86 and 87 of circuit 14 will interfere in the rest condition of circuit 14 with the operation of circuits 12 and 15.

The interference problem may be overcome in any one of a number of ways.

A first approach is to withhold supply voltage from the amplifiers 67–71 and 82–87 except during the operating cycle for the associated circuit, 15 or 14. Thus, for example, a second pair of contacts may be added to push-button switch 66 which supplies operating voltage, vce, to amplifiers 67–71 while switch 66 is closed.

At all other times these amplifiers will be inoperative for want of supply voltage.

Similarly, additional electronic gating circuits may be provided to deliver a supply voltage to amplifier, 82–87 only during the time when *e*3 of FIG. 3 is high or at the one level.

Figure 1C:
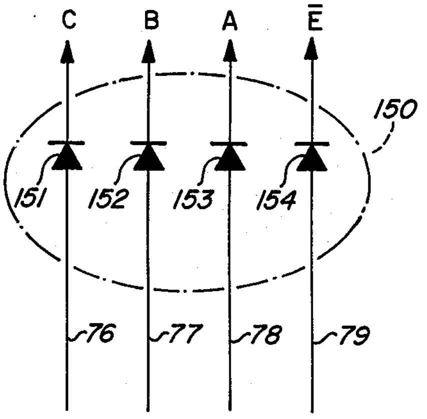
FIG. 1C illustrates a modification of the circuit of FIG. 1B.
Figure 1D:
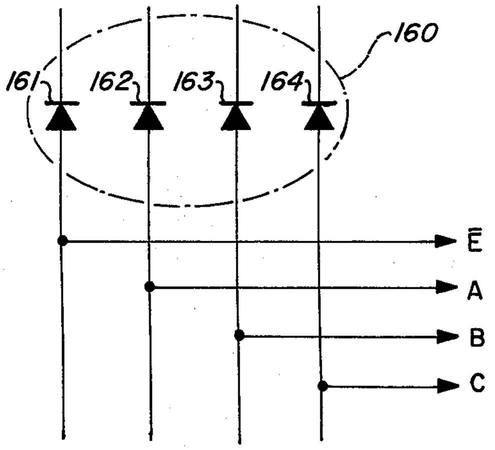
FIG. 1D illustrates a modification of the circuit of FIG. 1A.

A second approach is to add series blocking diodes as suggested by circled insertions 150 and 160 shown in FIGS. 1B and 1A, respectively, and illustrated in more detail in FIGS. 1C and 1D. The introduction of the blocking diodes permits each amplifier to deliver the signal required for the intended function but prevents it from delivering the opposite and unwanted signal during the rest state of the associated circuit.

For an UNLOCK operation, for example, lines 76, 77 and 78 of circuit 15 are positive or high while line 79 is at ground. The polarities of diodes 151–154 which may be inserted in lines 76–79 are seen to be appropriate not to interfere with these signals but will in each case block signals of the opposite polarities.

Similarly, diodes 161–164 as shown by insertion 160 when connected in series with the outputs of amplifiers 82, 83, 86 and 87 accomplish the same purpose for circuit 14.

A third approach is to provide a variation of the auxiliary circuits which does not involve the common connection gate outputs from the different circuits.

Figure 6:
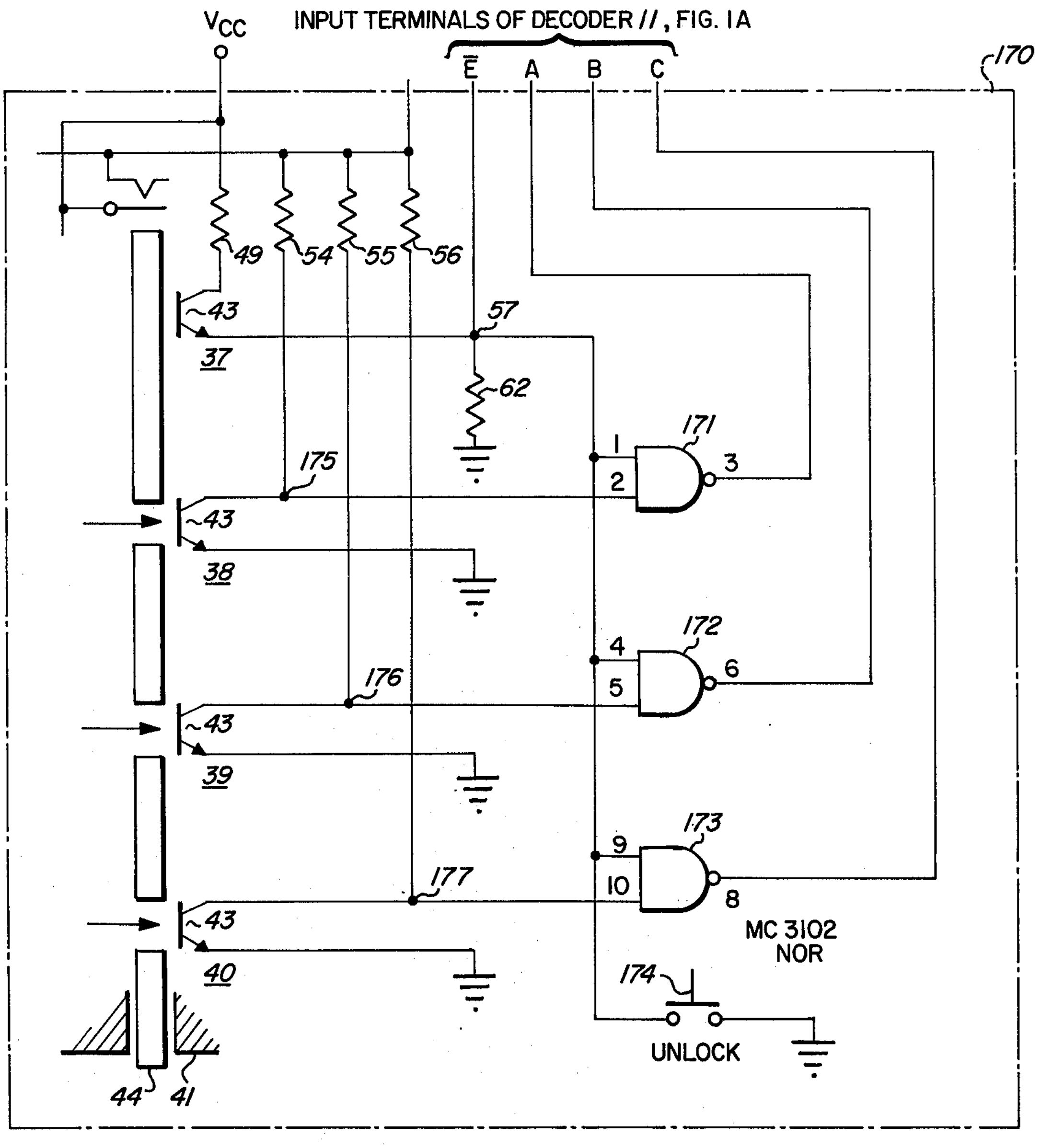

FIG. 6, for example, shows a combination of a key-operated unlocking circuit, formerly embodied in circuit 12 and a push-button operated unlocking circuit formerly embodied in circuit 15.

The combination circuit 170 of FIG. 6 incorporates a portion of the key-operated circuit 12 of FIG. 1B which is identical to circuit 12 in all respect except that in circuit 170 the emitters of phototransistors 38, 39 and 40 are grounded directly rather than through resistors as in circuit 12. In addition, output signals are taken from the collectors of transistors 38–40 in circuit 170 rather than from the emitters.

The combination circuit 170 comprises, in addition to the modification of circuit 12 just described, NOR gates 171, 172 and 173 and normally open, momentary push-button switch 174.

NOR gates 171–173 are typified by Motorola integrated circuit MC3102 as described in Motorola Semiconductor Products handbook, "TTL Integrated Circuits Data Book," First Edition, May, 1971. Each of the gates 171, 172 and 173 has two inputs, pins 1 and 2, 4 and 5, and 9 and 10, respectively, and one output pin, 3, 6 and 8 respectively. The output is high or positive in each case if neither of the two inputs is high, and the output is low if either or both of the inputs is high.

Consider first the operation of the circuit with key 44 inserted in keyway 41 and with switch 174 open as shown. Because key 44 blocks light to transistor 43 of device 37, no current flows through transistor 43 of device 37 or through resistor 62 and the voltage at output terminal 57 which connects to enable terminal $\overline{E}$ of decoder 11 is therefore zero which is appropriate to enable decoder 11. Output terminal 57 is also connected to input terminals 1, 4 and 9 of gates 171, 172 and 173, and these terminals are thus held at zero volts.

Because key 44 passes light to transistors 43 of devices 38, 39 and 40, these transistors are fully conductive and output terminals 175, 176 and 177 which are connected respectively to input terminals 2, 5 and 10 of gates 171, 172 and 173 are therefore also near zero volts.

Both input terminals of each of the gates 171, 172 and 173 have thus been shown to be at zero volts with key 44 inserted, and output terminals 3, 6 and 8 which are connected respectively to the A, B and C input terminals of decoder 11 are consequently high or in the one state which conditions as evidenced by the truth table of FIG. 2 produce a zero output at terminal $\overline{Q}7$ of decoder 11 and thereby initiate an unlocking operation through solenoid actuator 16.

If key 44 is now withdrawn transistor 43 of device 37 is illuminated and passes current through resistor 62 so that output terminal 57 is high. Because switch 45 is now open there is no voltage supplied at the upper ends of collector resistors 54, 55 and 56, the output at terminals 175, 176 and 177 and hence also the input terminals 2, 5 and 10 of gates 171, 172 and 173 are all zeros, i.e. at ground potential.

Now, when switch 174 is closed the signal at terminal 57 is shorted to ground through switch 174. By virtue of the connection of terminal 57 to the enable terminal $\overline{E}$ of decoder 11, decoder 11 is now enabled. But terminal 57 is also connected to input terminals 1, 4 and 9, respectively, of gates 171, 172 and 173, and these input terminals are therefore also at ground potential.

Because both input terminals of each of the gates 171, 172 and 173 are at ground potential, their output terminals 3, 6 and 8 which are connected, respectively, to input terminals A, B and C of decoder 11 are all in the high or one state, and decoder 11 output termminal $\overline{Q}7$ is thus set to the zero state which actuates the UNLOCK operation of actuator 16 as desired.

Additional circuit variations are possible for logically interconnecting the auxiliary circuits for push-button control of the locking and unlocking operations along with the key-operated circuit and the decoder. All such variations are considered to fall within the spirit of the invention and within the scope of the appended claims.

Although but a few embodiments of the present invention have been illustrated and described, it will be apparent to those skilled in the art that various changes and modifications may be made therein without departing from the spirit of the invention or from the scope of the appended claims.

What is claimed is:

1. An electronic lock mechanism having a keyway slot for a key comprising in combination:

a control circuit comprising an optical sensing matrix having a plurality of optical sensors, each sensor being normally energized unless unterrupted by an object inserted in the keyway slot, a logic decoder connected to said sensing matrix for receiving signals therefrom, said decoder responding to each of said signals received from said optical sensors and providing an alarm signal for all combinations of signals excepting a first predetermined combination of signals which generates a lock actuating signal and a second predetermined combination of signals which generates an unlock signal, and solenoid means for moving a door latching means, said solenoid means being connected to said logic decoder and energized by said lock actuating signal and said unlock signal, whereby the output of said decode logic controls the position of said latching means, said control circuit further comprising a time delay circuit connected between said logic decoder and said solenoid means for providing time delay before the lock actuating signal is effective, and
an alarm latch connected to an alarm for receiving said alarm signal for actuating the alarm.

2. An electronic lock mechanism having a keyway slot for a key comprising in combination:
a control circuit,
said control circuit comprises an optical sensing matrix having a plurality of optical sensors each comprising a light emitting diode and a phototransistor, each sensor being normally energized unless interrupted by an object inserted in the keyway slot, an alarm circuit, an unlock command circuit, a solenoid actuator circuit, and a logic decoder,
a solenoid means for controlling a door latching means,
a door latching means,
said logic decoder comprising an integrated circuit being connected to said sensing matrix for receiving signals therefrom in response to an object inserted in said keyway,
said decoder responding to each of said signals received from said optical sensors and providing an alarm signal formed from a first combination of signals from said logic decoder, an unlock signal for said unlock command circuit formed from a second combination of signals from said logic decoder, and a signal solenoid lock signal for said solenoid actuator formed from a third combination of signals from said logic decoder,
said unlock command circuit when energized actuating said solenoid means to unlock said latching means,
said solenoid actuator when energized locking said door latching means,
said control circuit further comprising a time delay circuit connected between said logic decoder and said solenoid means for providing a time delay before said lock signal is effective to actuate said solenoid means,
an alarm latch connected to an alarm for receiving said alarm signal for the alarm,
an audible alarm connected to said alarm latch for indicating an unauthorized unlocking operation, and
switching means operable by a key inserted in the keyway slot for energizing said optical sensors.

3. The electronic lock mechanism set forth in claim 2 wherein:
each of said diodes are spacedly mounted from each other along one side of said keyway and each of said phototransistors are spacedly mounted from each other along the other side of said keyway with each diode mounted directly across from its associated phototransistor.

4. The electronic lock mechanism set forth in claim 2 wherein:
said door latching means comprises a main bolt of magnetic material for latching a door,
said main bolt having an indentation along its length for receiving a latching bolt, and
a latching bolt of magnetic material arranged laterally of said main bolt for moving into and out of said indentation in said main bolt for controlling the movement of said main bolt,
said solenoid means actuating said main bolt and said latching bolt in response to signals received from said logic decoder.

5. The electronic lock mechanism set forth in claim 4 wherein:
said solenoid means comprises a separate coil for said main bolt and for said latching bolt.

* * * * *